Patented Nov. 15, 1932

1,887,608

UNITED STATES PATENT OFFICE

WALTER WETTSTEIN, OF MONTHEY, SWITZERLAND, ASSIGNOR TO SOCIETY OF CHEMICAL INDUSTRY IN BASLE, OF BASEL, SWITZERLAND

PROCESS FOR OBTAINING HYDROCYANIC ACID FROM GASES CONTAINING THE SAME

No Drawing. Application filed May 21, 1931, Serial No. 539143, and in Switzerland June 3, 1930.

It has been found that the esters of the organic carboxylic acids are suited for the extraction of hydrocyanic acid from gases containing hydrocyanic acid, and that from the solutions thus obtained concentrated hydrocyanic acid may be obtained.

For the absorption of the hydrocyanic acid from gases containing hydrocyanic acid such organic carboxylic acid esters or mixtures of such esters are especially qualified which are liquid at the working temperature prevailing in each case. But also solid carboxylic acid esters may be used, such as, for example, the natural fats and waxes, and that preferably by using a solvent suitable for these fats and waxes, such as, for example, halogen benzenes, tetrachlorethane, amyl alcohol. Since the absorbing capacity of the carboxylic acid esters decreases with rising temperatures, and since it is therefore advantageous to work at temperatures as low as possible, particularly such carboxylic acid esters and mixtures of esters come into question for the present process which have a melting point that does not lie essentially above $-20°$ C.

The new process is not only adapted for the absorption of hydrocyanic acid from gases which already exhibit a high percent content of hydrocyanic acid, but it is particularly also valuable if it is question of the obtention of concentrated hydrocyanic acid from dilute gases.

In order that a good separation of the hydrocyanic acid from the carboxylic acid ester may be attained at the isolation of the concentrated hydrocyanic acid from its solutions in the carboxylic acid esters, it is advantageous to use esters which have a boiling point that lies relatively high, for instance above 100° C. Such esters are for example oxalic acid diethyl ester, phthalic ester, the homologues and analogues thereof, as well as the monocarboxylic acid esters, viz. cyano-acetic acid ester, propionic acid amyl ester, cyclo-hexanal acetate, benzoic acid ethyl ester, acetic acid benzyl ester, glycolic acid ester, $\alpha$- and $\beta$-lactic acid ester, mono-chlor- and dichlor-acetic acid ester and the homologues and mixtures of these esters.

The following table illustrates the absorbing capacities of some organic carboxylic acid esters for hydrocyanic acid.

From a gas containing 1 per cent. by volume of hydrocyanic acid, at $-20°$ C. and at atmospheric pressure, there is taken up by:

| | Grams of HCN per litre |
|---|---|
| Ethyl acetate | 150 |
| Propyl acetate | 105 |
| Amyl acetate | 48 |
| Propyl valerate | 42 |
| Isobutyl butyrate | 40 |
| Methyl heptylate | 40 |

From a gas containing 0.8 per cent by volume of hydrocyanic acid, at $-20°$ C. and at atmospheric pressure, there is taken up by:

| | Grams of HCN per litre |
|---|---|
| Ethyl oxalate | 90 |
| Ethyl malonate | 59 |
| Ethyl succinate | 46 |
| Ethyl phthalate | 29 |

*Example*

A gas containing 1 per cent. by volume of hydrocyanic acid is passed through a suitable absorption apparatus which has been charged with oxalic acid diethylester cooled down to $-20°$ C., and which is working advantageously according to the counter-current principle. From the solution of hydrocyanic acid in oxalic acid diethylester thus obtained the concentrated hydrocyanic acid may be extracted in a pure form for example by distillation and condensation.

The absorption may of course also take place at raised temperatures.

What I claim is:—

1. Process for the production of hydrocyanic acid in concentrated form from gases containing hydrocyanic acid, consisting in washing gases containing hydrocyanic acid with organic carboxylic acid esters, and isolating the hydrocyanic acid from the solutions thus obtained.

2. Process for the production of hydrocyanic acid in concentrated form from gases containing hydrocyanic acid, consisting in washing gases containing hydrocyanic acid with organic carboxylic acid esters which are liquid at the working temperature, and isolating the hydrocyanic acid from the solutions thus obtained.

3. Process for the production of hydrocyanic acid in concentrated form from gases containing hydrocyanic acid, consisting in washing gases containing hydrocyanic acid with mixtures of organic carboxylic acid esters which are liquid at the working temperature, and isolating the hydrocyanic acid from the solutions thus obtained.

4. Process for the production of hydrocyanic acid in concentrated form from gases containing hydrocyanic acid, consisting in washing gases containing hydrocyanic acid in a dilute condition, with organic carboxylic acid esters which are liquid at the working temperature, and isolating the hydrocyanic acid from the solutions thus obtained.

5. Process for the production of hydrocyanic acid in concentrated form from gases containing hydrocyanic acid, consisting in washing gases containing hydrocyanic acid in a dilute condition, with organic carboxylic acid esters which are liquid at the working temperature, and the boiling point of which lies above 100° C., and isolating the hydrocyanic acid from the solutions thus obtained.

6. Process for the production of hydrocyanic acid in concentrated form from gases containing hydrocyanic acid, consisting in washing gases containing hydrocyanic acid in a dilute condition, with organic dicarboxylic acid esters which are liquid at the working temperature, and the boiling point of which lies above 100° C., and isolating the hydrocyanic acid from the solutions thus obtained.

7. Process for the production of hydrocyanic acid in concentrated form from gases containing hydrocyanic acid, consisting in washing gases containing hydrocyanic acid in a dilute condition, with oxalic acid diethyl ester, and isolating the hydrocyanic acid from the solutions thus obtained.

In witness whereof I have hereunto signed my name this 11th day of May, 1931.

WALTER WETTSTEIN.